April 19, 1949.　　　A. H. CANADA　　　2,467,808
STATIONARY CHART RECORDER
Filed Sept. 11, 1947
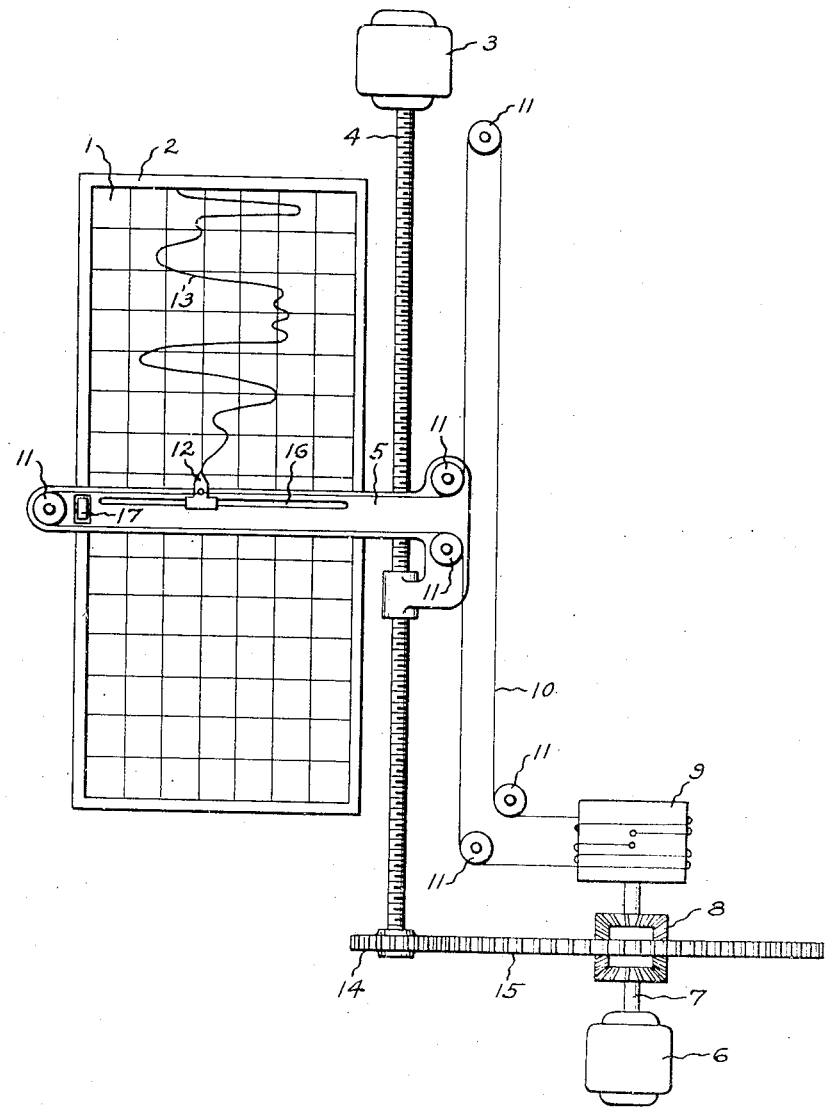
Inventor:
Alfred H. Canada,
by　*Burrell S. Mack*
　His Attorney.

Patented Apr. 19, 1949

2,467,808

UNITED STATES PATENT OFFICE 2,467,808

STATIONARY CHART RECORDER

Alfred H. Canada, Schenectady, N. Y., assignor to General Electric Company, a corporation of New York Application September 11, 1947, Serial No. 773,415

1 Claim. (Cl. 346—34)

My invention relates to an improvement in recorders and more particularly to a graphic recorder in which the chart is stationary.

The object of my invention is to provide an improved graphic recorder in which the chart is stationary, thus permitting notations to be made upon the chart while the recorder is in operation, in which the entire chart is visible at all times, in which the coordinates of the chart are rectangular, and in which the moving parts have low inertia so that the recorder can operate at high speeds.

The features of my invention which are believed to be novel and patentable will be pointed out in the claim appended hereto. For a better understanding of my invention reference is made in the following description to the accompanying drawing in which the single figure represents a plan view of my invention.

A chart 1 or sheet upon which the record is to be made is held flat and in a fixed position by a supporting member 2 or table. A motor 3 rotates a lead screw 4 proportional to changes in the independent variable of the function being recorded. The independent variable may be "time," for example, or when the recorder is used with a spectrophotometer, "wavelength." As the lead screw rotates a traveling arm 5 is moved thereby in a direction parallel to the axis of the lead screw. The traveling arm extends across the chart, as shown. A motor 6 rotates a positioning shaft 7 proportional to changes in the dependent variable of the function being recorded. The dependent variable may be "temperature," for example, or "light intensity." The rotation of the positioning shaft is transmitted through a differential gear 8 to a drum 9. A thread 10, which may be of metal, fibre, or other material, at each of its ends is wound around and attached to drum 9, and elsewhere is supported by pulleys 11, as shown, so that a section of the thread extends across the chart and is adapted to move in a direction parallel to the axis of lead screw 4 responsive to a like movement of traveling arm 5, and to move in a direction perpendicular to such lead screw responsive to a rotation of drum 9, hence to a rotation of positioning shaft 7. A pen 12, or pencil or other writing member is attached to this section of the thread and positioned thereby on the chart. The pen is adapted to leave a mark 13 upon the chart showing its path thereon, which is a graphic representation in rectangular coordinates of the function recorded. Gears 14 and 15 act through differential 8 to rotate drum 9 responsive to the rotation of lead screw 4 so that when shaft 7 does not rotate, the dependent variable being unchanged in value, pen 12 will trace a straight line parallel to the base of the chart. Unless this or an equivalent means were employed it is evident that the pen would trace a diagonal line across the chart responsive to an unchanging value of the dependent variable. Thus the total rotation of drum 9 is the algebraic sum of the two rotations imparted to it responsive to the rotations of the positioning shaft and the lead screw respectively, and the motion of the pen relative to the traveling arm is responsive only to the rotation of the positioning shaft. A groove 16 is provided in traveling arm 5 which is engaged by a portion of pen 12 so that the pen is held in proper position relative to the traveling arm. A wheel 17 supports one end of arm 5 as shown so that it may travel along the chart with minimum friction.

In accordance with the patent statutes, I have described the principle of my invention together with the apparatus which I now consider to represent its best embodiment, but I wish it to be understood that the apparatus shown is only illustrative and that the invention may be carried out by other means.

What I claim as new and desire to secure by Letters Patent of the United States is:

Apparatus for recording one variable as a function of another variable upon a stationary chart, comprising chart-supporting means to hold the chart in a flat, stationary position, a lead screw with its axis parallel to the surface of the chart, means to rotate said lead screw by amounts proportional to changes in one of the two variables, a positioning member, means to rotate said positioning member by amounts proportional to changes in the other of the two variables, a drum, differential gear means connected in driven relation to said lead screw and said positioning member and in driving relation to said drum to rotate the drum responsive to rotation of the lead screw and also responsive to rotation of the positioning member, the total rotation of the drum being the algebraic sum of the two motions thus imparted to it, a traveling arm in threaded engagement with said lead screw and extending across the chart substantially perpendicular to the axis of the lead screw, a thread and thread-supporting means therefor, said thread having a portion of its length wound about said drum so that the thread is moved when the drum is rotated, part of said thread-supporting means being attached to said traveling arm to support a section of said thread across the chart substantially perpendicular to the axis of the lead screw so that such section moves with the traveling arm in a direction parallel to the lead screw axis when the lead screw is rotated and moves in a direction perpendicular to the lead screw axis when the positioning member is rotated, said differential gear means having gear ratios such that rotation of the lead screw alone does not move said section of thread perpendicular to the lead screw axis, and a writing member attached to and moving with said section of thread and positioned to mark its path upon the chart.

ALFRED H. CANADA.

REFERENCES CITED

The following references are of record in the file of this patent:

UNITED STATES PATENTS

| Number | Name | Date |
|---|---|---|
| 688,783 | Keiley | Dec. 10, 1901 |
| 994,677 | Hennah et al. | June 6, 1911 |
| 1,985,265 | Smith | Dec. 25, 1934 |
| 1,985,266 | Smith et al. | Dec. 25, 1934 |